United States Patent [19]

Stol et al.

[11] Patent Number: 5,435,110

[45] Date of Patent: Jul. 25, 1995

[54] METHOD OF JOINING OF HOLLOW FRAMEWORK AND ASSOCIATED FRAME ASSEMBLY

[75] Inventors: Israel Stol, Mount Lebanon; Russell S. Long, Pittsburgh; James D. Klingensmith, Apollo, all of Pa.

[73] Assignee: Aluminum Company of America, Pittsburgh, Pa.

[21] Appl. No.: 101,834

[22] Filed: Aug. 4, 1993

[51] Int. Cl.⁶ .................... F16B 7/18; F16B 7/00
[52] U.S. Cl. .................... 52/655.1; 52/656.9; 403/171; 403/170; 403/176
[58] Field of Search ............... 52/655.1, 653.2, 656.9, 52/81.1; 403/171, 170, 176, 217, 218

[56] References Cited

U.S. PATENT DOCUMENTS

| | | |
|---|---|---|
| 2,742,690 | 4/1956 | Kunkel . |
| 2,990,203 | 6/1961 | Grover et al. . |
| 3,218,097 | 11/1965 | Bowers et al. . |
| 3,255,721 | 6/1966 | Peterschmidt .................... 403/176 |
| 3,485,519 | 12/1969 | Chiu . |
| 3,688,461 | 9/1972 | Rensch .................... 52/655.1 |
| 3,726,551 | 9/1973 | Levenberg .................... 52/656.9 |
| 3,778,175 | 12/1973 | Zimmer .................... 52/656.9 |
| 3,791,091 | 2/1974 | Albrizzi . |
| 3,851,601 | 12/1974 | Davis . |
| 4,027,987 | 6/1977 | Berkowitz . |
| 4,036,371 | 7/1977 | Michel . |
| 4,072,432 | 2/1978 | Levy .................... 403/176 |
| 4,076,432 | 2/1978 | Glaser . |
| 4,261,148 | 4/1981 | Scott . |
| 4,271,654 | 6/1981 | Jungbluth .................... 52/655.1 |
| 4,353,661 | 10/1982 | Ruther . |
| 4,385,850 | 5/1983 | Bobath . |
| 4,460,288 | 7/1984 | Schaff . |
| 4,562,681 | 1/1986 | Smith .................... 52/655.1 |
| 4,622,795 | 11/1986 | Codd .................... 52/655.1 |
| 4,630,550 | 12/1986 | Weitzman .................... 403/171 |
| 4,660,345 | 4/1987 | Browning . |
| 4,709,241 | 11/1987 | Cusson . |
| 4,712,942 | 12/1987 | Brown . |
| 4,960,343 | 10/1990 | Reilly .................... 403/171 |
| 4,988,230 | 1/1991 | Banthia et al. .................... 52/656.9 |

FOREIGN PATENT DOCUMENTS

| | | |
|---|---|---|
| 0079314 | 5/1983 | European Pat. Off. ........... 52/655.1 |
| 1415658 | 9/1965 | France . |
| 454555 | 7/1968 | Switzerland . |

Primary Examiner—Carl D. Friedman
Assistant Examiner—Wynn E. Wood
Attorney, Agent, or Firm—George K. Stacey; Thomas R. Trempus

[57] ABSTRACT

A method of joining a plurality of generally hollow frame members is provided. The generally hollow frame members are secured to central portions of core members. The core members are positioned in juxtaposition with respect to one another so as to enclose a space therebetween with the core member extending generally outwardly from the enclosed space. The core members are secured to one another. An associated frame assembly is also provided.

14 Claims, 9 Drawing Sheets

METHOD OF JOINING OF HOLLOW FRAMEWORK AND ASSOCIATED FRAME ASSEMBLY

BACKGROUND OF THE INVENTION

1. Field of the Invention

This invention relates generally to joining components together to form a structural frame, and, more particularly, to joining a plurality of generally hollow frame members to form a space frame for a vehicle.

2. Discussion of Related Art

Structural components are joined to form structural frameworks for many purposes. Hollow structural components may be utilized in structural frames to decrease weight and simplify construction. Metal extrusions are often used because the cross-sectional shape of the extrusions can be designed to establish the desired shape and maximize the extrusion's strength while minimizing its weight. Structural frames which utilize hollow frame members have many uses. For example, U.S. Pat. No. 2,742,690 discloses a method of joining hollow components to form a window sash. International Patent Application No. PCT/DK84/00108 discloses a joint unit for joining hollow structural members. U.S. Pat. No. 4,709,241 discloses a satellite dish antenna frame. U.S. Pat. No. 4,076,432 discloses a corner construction for making furniture and the like.

One area where hollow frame members are used is in constructing space frames for motor vehicles. Because traditionally motor vehicles have been made of steel, the manufacturing methods have evolved into mature technologies. As the use of alternative materials, such as aluminum and resinous plastics, increases, alternative manufacturing processes must be developed. The inherent differences between steel and alternative materials, such as aluminum and plastics, prevent the direct application of all steel manufacturing technologies to such materials. Space frames technology is well suited for manufacturing motor vehicles using alternative materials.

Space frames permit flexibility for altering the design of the vehicle's body. In addition, the use of space frames results in lighter vehicle bodies which, in turn, may result in more fuel efficient vehicles. The points at which the frame members of a space frame are joined are typically referred to as nodes or node points. U.S. Pat. No. 4,660,345 discloses a vehicle space frame which utilizes castings to join the hollow structural members at the node points. The use of castings at the joints has several disadvantages. Castings are typically relatively expensive to produce and require expensive and specialized tooling to produce. Because of the complexity of the tooling and the complexity of designing the castings, long lead times and large financial investments are typically required if changes are to be made to the structural design of the space frame which uses castings. There is a need for a frame assembly method for joining hollow frame components which utilizes simple components for the joints, or frame assemblies, of the structure and which does not require the complex and expensive tooling and the long lead time associated with conventional assemblies.

SUMMARY OF THE INVENTION

This invention has met the above-described needs.

This invention provides a method of joining a plurality of generally hollow frame members which includes providing at least two frame members; providing at least one core member each having at least one central portion; securing at least one frame member to the central portion of at least one of the core members; positioning the core members in juxtaposition with respect to one another so as to enclose at least one space therebetween with the frame members extending generally outwardly from the enclosed space; and securing the core members to one another. The frame members are preferably aluminum extrusions. The core members are preferably aluminum plates, extrusions castings and/or stampings.

This invention further includes a hollow frame assembly for connecting a plurality of juxtaposed generally hollow frame members. The frame assembly includes a plurality of core members each having a central portion. The core members are positioned in juxtaposition with respect to one another and secured to one another so as to enclose at least one space therebetween. Attachment means are provided for securing at least one of the hollow frame members to the central portion of at least one of the core members such that the frame members extend generally outwardly from the enclosed space.

It is an object of this invention to provide a method of joining hollow frame members that is relatively simple and inexpensive as compared with conventional methods.

It is another object of this invention to provide a method of joining such frame members that does not require the long lead times and specialized equipment that are currently associated with conventional methods.

It is a further object of this invention to provide a method of joining such frame members and an associated nodal frame assembly which utilize plates, simple sheet stampings, relatively simple shaped castings and/or extrusions to form the frame assemblies.

It is another object of this invention to provide a method of joining such frame members and an associated nodal frame assembly which utilize welding, adhesive bonding, riveting or combinations of those joining techniques, to join the components to one another.

It is a further object of this invention to provide a method of joining such frame members and an associated nodal frame assembly which can be used to join metal extrusions.

It is yet another object of this invention to provide a method of joining such frame members and an associated nodal frame assembly which may be utilized to construct space frames for automobiles.

These and other objects of this invention will be readily apparent from the following description of the preferred embodiment upon reference to the drawings.

BRIEF DESCRIPTION OF THE DRAWINGS

FIGS. 5b–5e sectional views showing different embodiments of the connecting means of FIG. 5a.

DETAILED DESCRIPTION OF A PREFERRED EMBODIMENT

Figure 1:
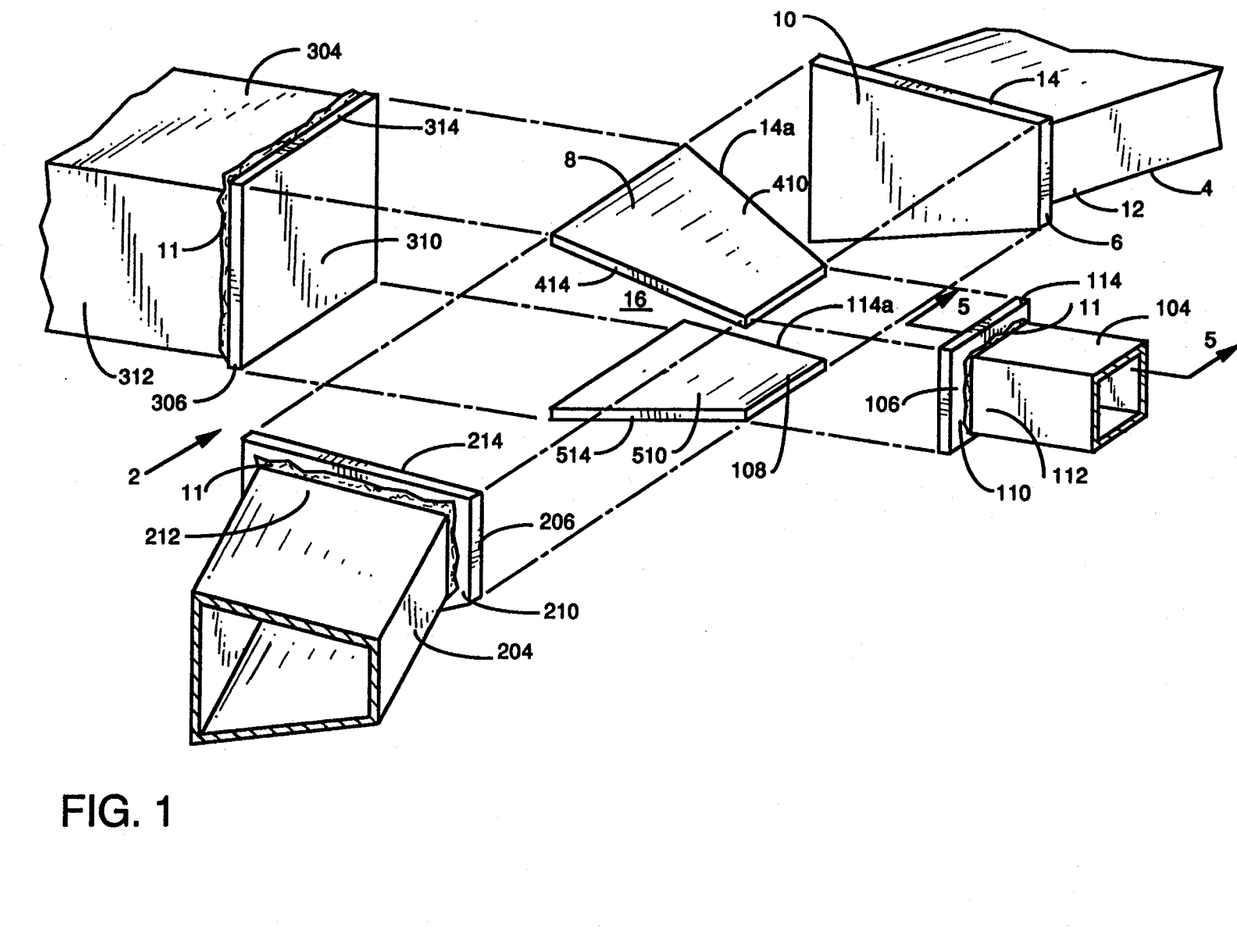
FIG. 1 is a partially exploded perspective view of an embodiment of the frame assembly of this invention.

Referring to FIG. 1, there is shown a partially exploded view of a frame assembly 2 of this invention. At least two generally hollow frame members 4 are provided. In the embodiment shown, four frame members 4, 104, 204, 304 are provided. At least one core member 6, 106, 206, 306, 8, 108 is also provided. Each core member includes at least one central portion 10, 110, 210, 310, 410, 510. Each central portion is preferably bounded by a circumferential peripheral edge surface 14. In the embodiment shown in FIG. 1, four core members 6, 106, 206, 306 are shown and two core members 8, 108 are shown. Attachment means are provided for securing at least one end 12, 112, 212, 312 of at least one frame member 4, 104, 204, 304 to a central portion 10, 110, 210, 310 of each core member 6, 106, 206, 306. In a preferred embodiment, attachment means 11 are provided for securing one end 12 of one frame member 4 to the central portion 10 of each core member 6. No attachment means are provided for core members 8, 108 in this embodiment. Core members 6, 106, 206, 306, 8, 108 are positioned in juxtaposition with respect to one another so as to enclose a space 16 therebetween, with frame members 4, 104, 204, 304 extending generally outwardly from space 16.

Figure 2:
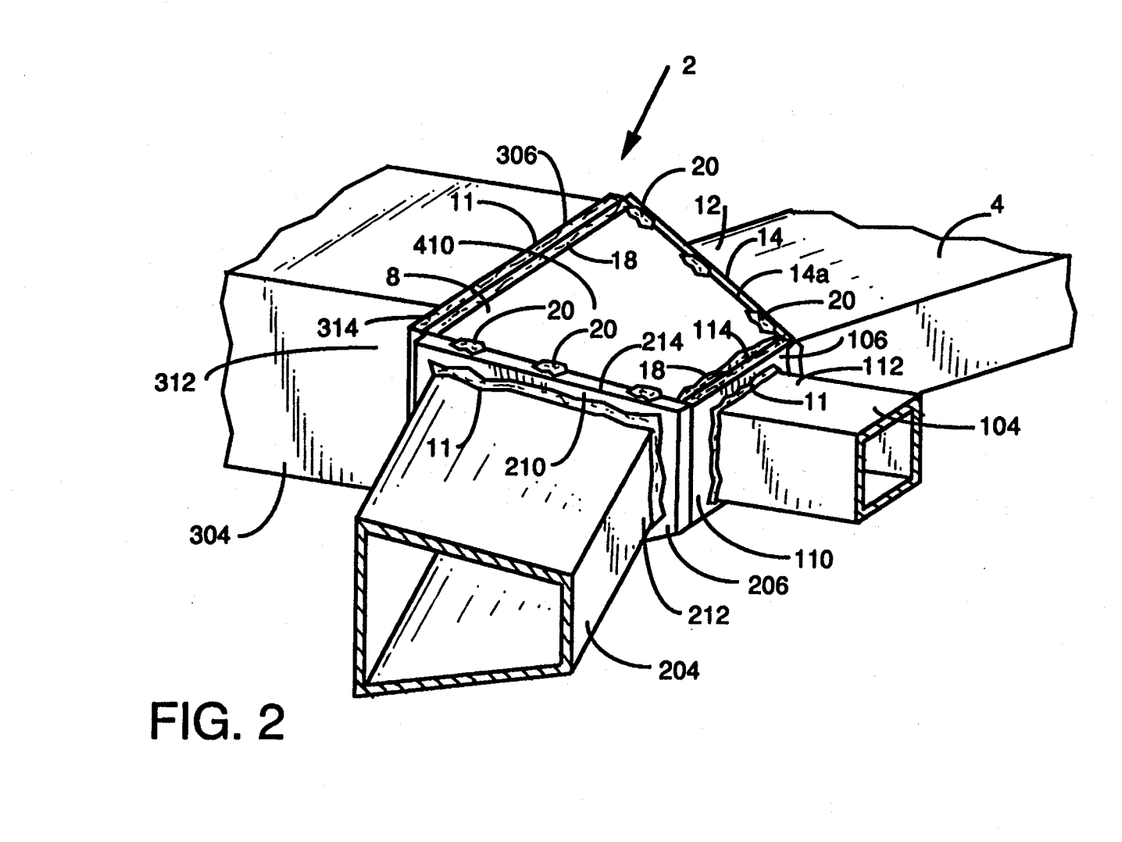
FIG. 2 is a perspective view of the assembled frame assembly of FIG. 1.

Referring to FIG. 2, the juxtaposed core members 6, 106, 206, 306, 8, 108 are secured to one another. In a preferred embodiment, core members 6, 106, 206, 306, 8, 108 are welded to one another. The welded joint may be in the form of a continuous weld 18, an intermittent weld 20 or any suitable weld configuration known to those skilled in the art.

Peripheral edge surfaces 14, 114, 214, 314, 414, 514 surround central portions 10, 110, 210, 310, 410, 510 of core members 6, 106, 206, 306, 8, 108.

In a preferred embodiment, adjacent peripheral edge surfaces of adjacent core members are secured to one another. It will be appreciated, however, that the core members may be positioned such that peripheral edge surfaces of one or more core members extend beyond the peripheral edge surfaces of one or more adjacent core members.

In a preferred embodiment, frame members 4, 104, 204, 304 are rigid metal extrusions. In the embodiment of FIGS. 1 and 2, frame members 4, 104, 204, 304 are shown as having generally rectangular or four-side polygonal cross-sectional shapes. It will be appreciated, however, that the cross-sectional shapes of the frame members may be of any desired configuration. In addition, all of the frame members being joined at a particular frame assembly need not have the same cross-sectional shape or size.

Figure 3:
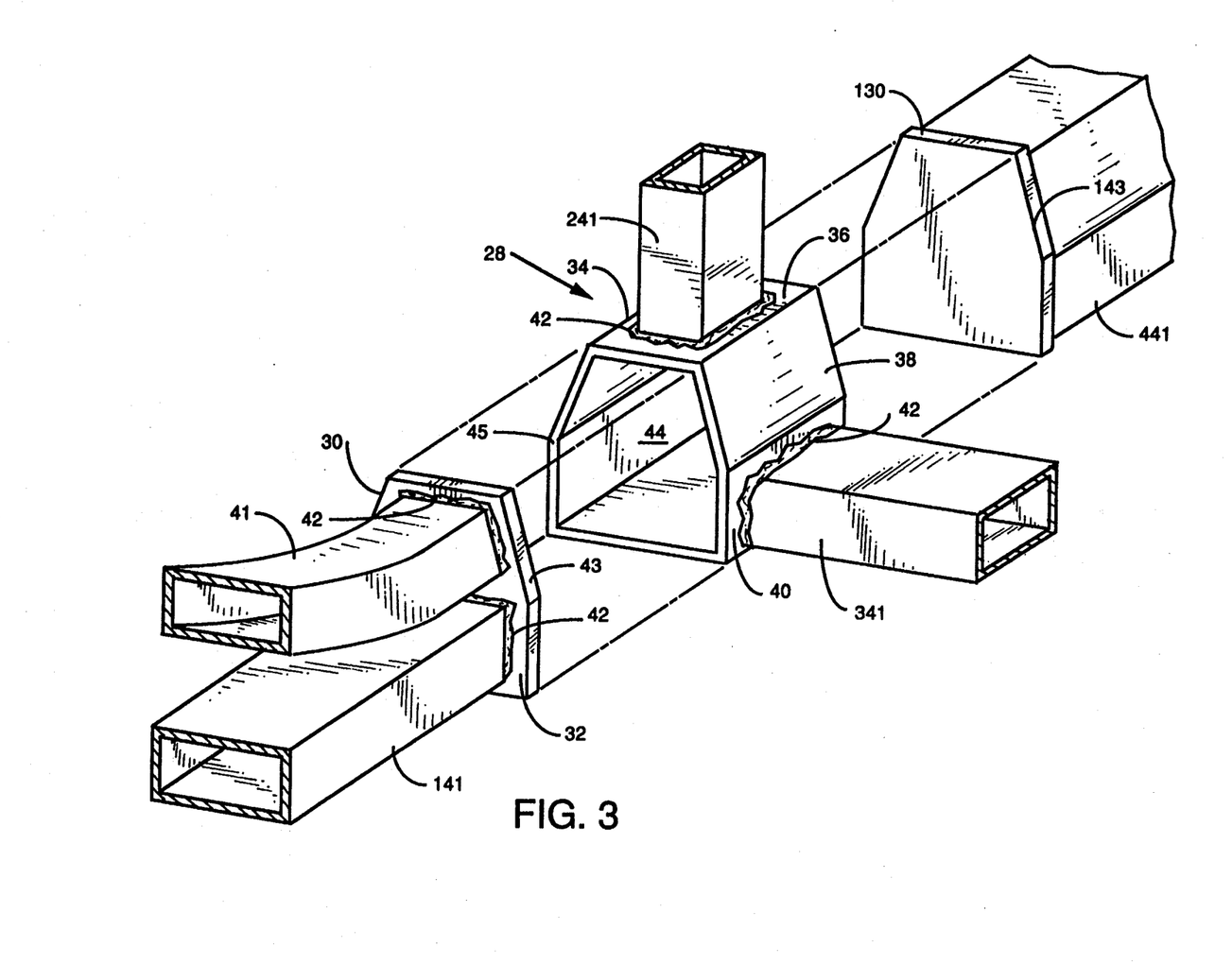
FIG. 3 is a partially exploded perspective view of another embodiment of the frame assembly of this invention.

Referring now to FIG. 3, there is shown another embodiment of a frame assembly 28 of this invention. In this embodiment, core members 30, 130 each have generally planar configuration and one central portion 32. Core member 34 is also provided. Core member 34 has a plurality of central portions 36, 38, 40. A plurality of frame members 41, 141, 241, 341, 441 are secured to central portions 32, 36, 40 using attachment means 42. Two frame members 41, 141 are shown connected to central portion 32 of one core member 30. It will be appreciated that any core member may be dimensioned so as to accommodate any desired number of frame members attached thereto.

Core member 34, shown in FIG. 3, is preferably a metal extrusion. Core members 30, 130 are preferably secured to peripheral edge surfaces 45 of core member 34 to enclose space 44 therebetween. Preferably, the peripheral edge surfaces 43, 143 of core members 30, 130 are secured to the peripheral edge surfaces 45 of core member 34.

Figure 4:
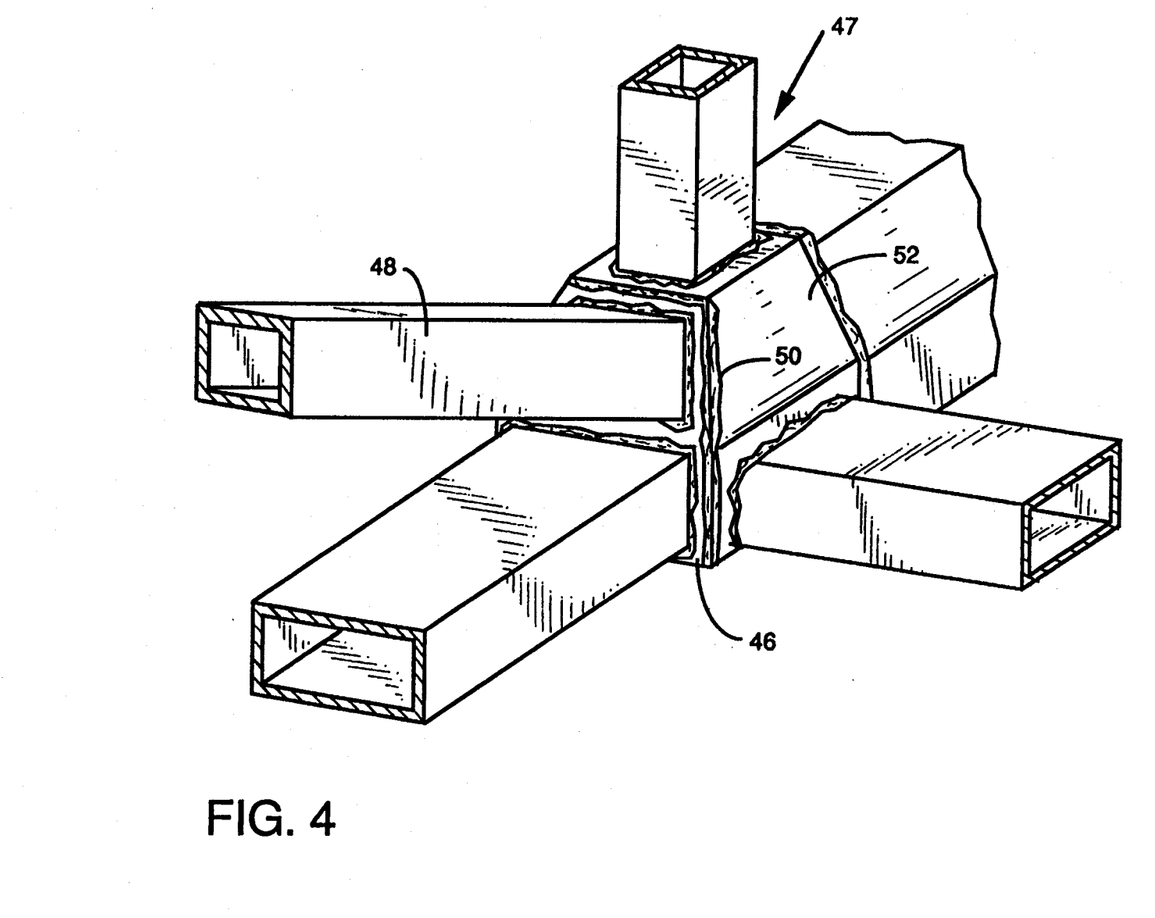
FIG. 4 is a perspective view of another embodiment of the frame assembly of this invention.

Referring to FIG. 4, there is shown another embodiment of the frame assembly 47 of this invention. The embodiment shown in FIG. 4 is substantially similar to that shown in FIG. 3, except that core member 46 is bent to accommodate the desired orientation of frame member 48. In addition, peripheral edge surfaces 50 of core member 52 has been modified to accommodate the non-planar shape of core member 46 so as to enclose the frame assembly.

Referring again to FIGS. 1, 2 and 4, in a preferred embodiment, at least one peripheral edge surfaces of at least one core member may be oriented obliquely with respect to the other peripheral edge surfaces thereof. In FIG. 1, peripheral edge surfaces 14a of core member 8 and 114a of core member 108 are oriented obliquely with respect to the other peripheral edge surfaces of core members 8 and 108. This permits the frame member 4 which is secured to the core member which is secured to edge surfaces 14a and 114a to be oriented in any desired direction. Referring to FIG. 4, peripheral edge surface 50 of core member 52 is oriented obliquely with respect to the other peripheral edge surfaces of core member 52. By changing the angle of any of the peripheral edge surfaces of the core members, the frame assembly can accommodate frame members oriented in any desired angle. Referring to FIGS. 1 and 2, the end 12 of frame member 4 is preferably generally perpendicular to the longitudinal axis of the frame member. Changes in the design of the framework which necessitate changes in the orientation of one or more frame member require only that the orientation of the corresponding peripheral edge surfaces of the core members be changed. Since the core members of this invention are preferably made using stamping processes, metal extrusions, and/or simple castings, changing the orientation of one or more peripheral edge surface thereof is a relatively simple process. With conventional frames which use castings to join the components, such a change would require redesigning the casting and the casting molds or dies, which is an expensive and time consuming process.

Figure 5A:
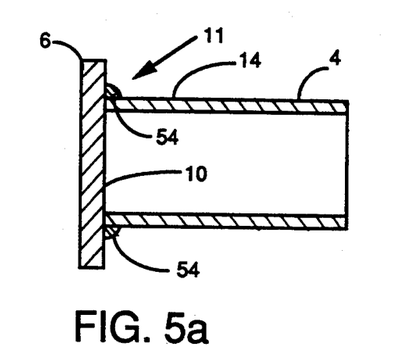
FIG. 5a is a sectional view taken through line 5—5 of FIG. 1.

Referring to FIGS. 5a–5e, there are shown several preferred examples of attachment means 11 for securing frame member 4 to core member 6 in the embodiment of FIGS. 1 and 2. FIG. 5a shows attachment means 11 which includes core member 6 having frame member 4 secured directly to the outer surface of central portion 10. In this embodiment, frame member 4 is preferably secured to core member 6 using welding at location 54. The end of frame member 4 that is secured to core member 6 may be provided with one or more flanges to further facilitate attachment.

Figure 5B:
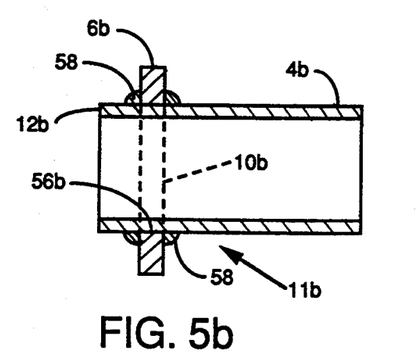

FIG. 5b shows an embodiment of attachment means 11b which includes core member 6b having an opening 56b in central portion 10b thereof. Frame member 4b is received within opening 56b. Core member 6b and frame member 4b are preferably welded together at location 58 and/or any other suitable locations.

Figure 5C:
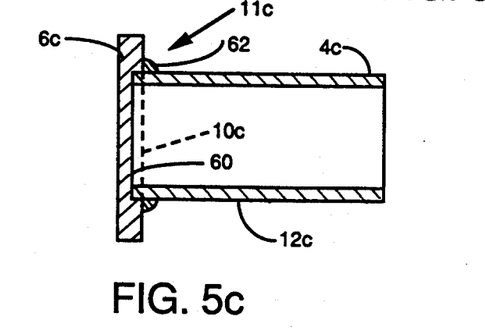

FIG. 5c shows an embodiment of attachment means 11c which includes core member 6c having a recess 60 in central portion 10c thereof. The frame member 4c is received within recess 60. Core member 6c and frame member 4c are preferably welded together at location 62.

Figure 5D:
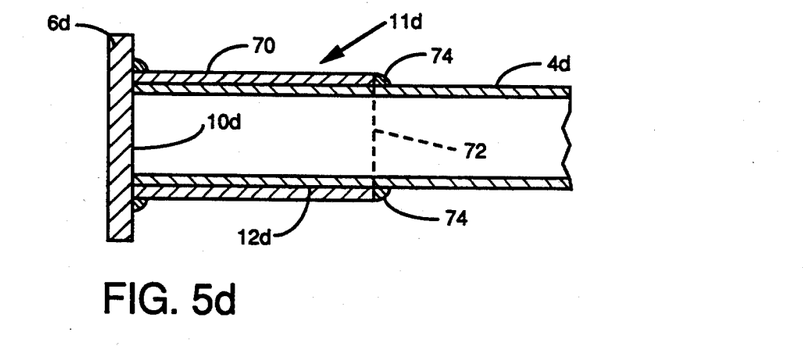

FIG. 5d shows an embodiment of attachment means 11d which includes a socket 70 secured to a central portion 10d of core member 6d. Socket 70 may be secured to central portion 10d in any suitable manner known to those skilled in the art. For example, socket 70 may be secured to central portion 10d in a manner similar to that shown in FIGS. 5a and 5c. Socket 70 is positioned so as to receive end 12d of frame member 4d within open end 72 thereof. Frame member 4d is preferably secured to socket 70 by welding at location 74. Socket 70 is preferably a hollow metal extrusion of sufficient size and appropriate shape to receive frame member 4d therein. Socket 70 may be integrally formed with the remainder of core member 6d. It will be appreciated, however, that any suitable material may be used to construct socket 70. FIG. 5d shows core member 6d as being solid. It will be appreciated, however, that core member 6d may be formed with at least one opening therein, similar to that shown in FIG. 5b. It will also be appreciated that frame member 4d may extend any desired distance into socket 70.

Figure 5E:
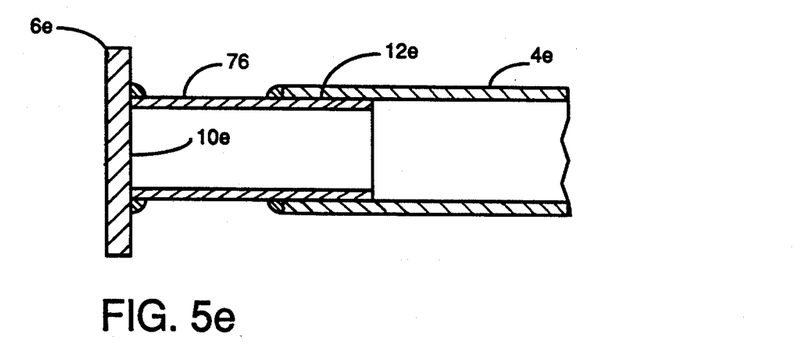

FIG. 5e shows an embodiment of attachment means 11e which includes a post 76 secured to a central portion 10e of core member 6e. Post 76 is preferably welded to central portion 10e. It will be appreciated, however, that post 76 may be secured to central portion 10e in any suitable manner known to those skilled in the art. In addition, post 76 may be integrally formed with the remainder of core member 6e. For example, post 76 may be secured to central portion 10 in a manner similar to that shown in FIGS. 5a, 5b and 5c. Post 76 is positioned so as to be received within the hollow portion of end 12e of frame member 4e. Frame member 4e is preferably secured to post 76 by welding. As shown in FIG. 5e, about one half of post 76 is inserted within frame member 4e. It will be appreciated, however, that any desired amount of post 76 may be inserted into frame member 4e in order to achieve the desired level of engagement therebetween. In addition, it will be appreciated that core member 6e may be formed having one or more openings therein.

Referring again to FIGS. 5a through 5e, in preferred embodiments, the components are welded to one another. It will be appreciated, however, that any suitable manner of securing the components to one another may be used. For example, mechanical fasteners, adhesives, brazing and the like may be used. In the examples shown in FIGS. 5a through 5e, only one frame member is secured to the core member. However, as discussed hereinbefore, any desired number of frame members may be secured to any core member. In addition, any desired combination of the illustrated examples of attachment means shown in FIGS. 5a through 5e may be utilized for attaching frame members to any single core member and/or to any frame assembly.

Figure 6:
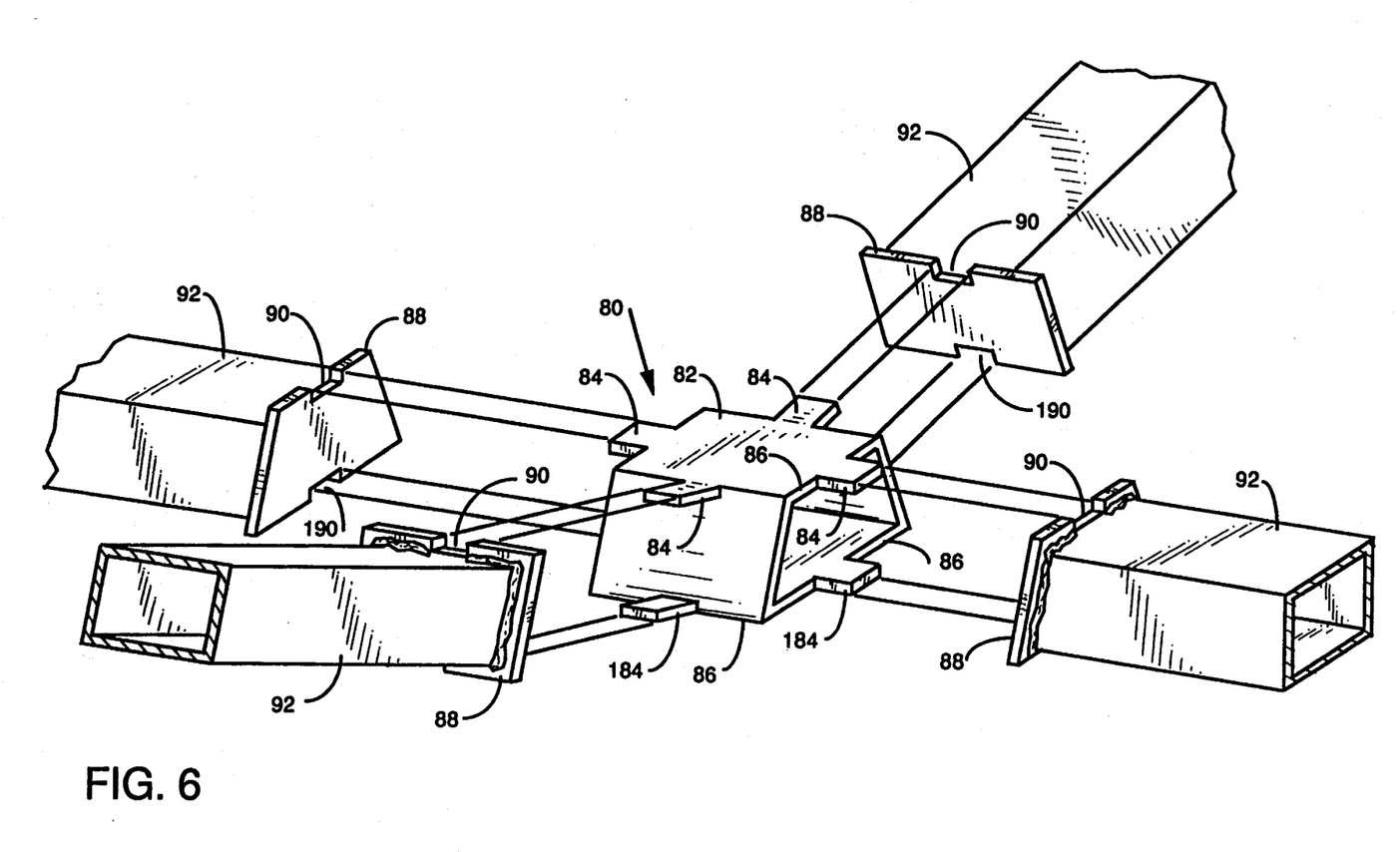
FIG. 6 is a partially exploded perspective view of another embodiment of a frame assembly of this invention.

Referring now to FIG. 6, there is shown another embodiment of frame assembly 80 of this invention. In this embodiment, at least one core member 82 is provided with at least one tab 84 on a peripheral edge surface 86 thereof. In the embodiment shown, tabs 84 and 184 are provided on outwardly facing peripheral edge surfaces 86 thereof. Core members 88 are provided with notches 90, 190 which are positioned to receive tab 84, 184 therein. As shown in FIG. 6, tabs 84, 184 are received into notches 90, 190 to align core members 80 with core members 88. In a preferred embodiment, frame members 92 are secured to core members 88.

Figure 7:
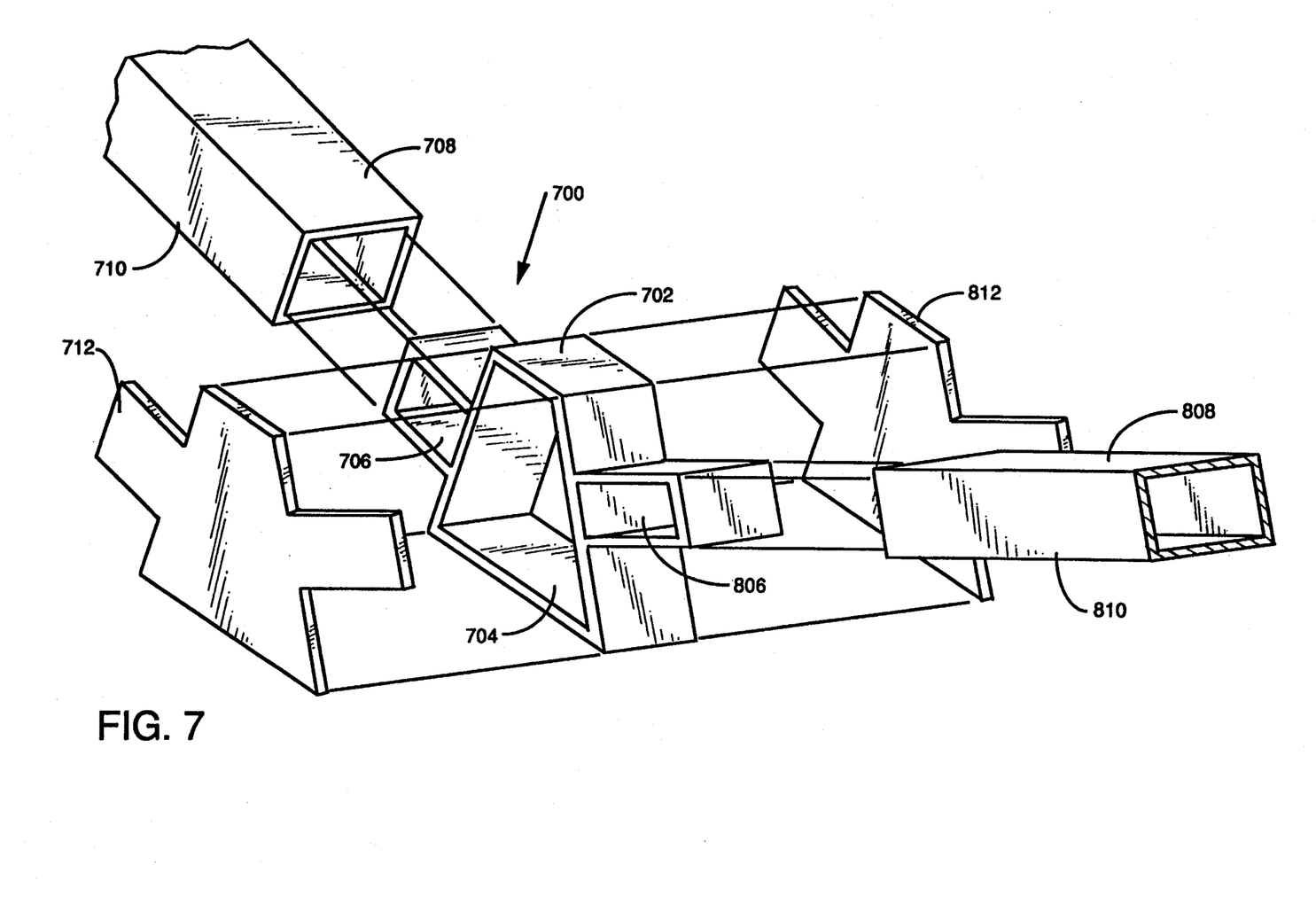
FIG. 7 is a partially exploded perspective view of another embodiment of a frame assembly of this invention.

Referring to FIG. 7, there is shown another embodiment of the frame assembly 700 of this invention. In this embodiment, core member 702 is an extrusion which includes three open areas 704, 706, 806. Open areas 706 and 806 define posts which are received within ends 708, 808 of frame members 710, 810. Frame members 710 and 810 are preferably secured to core member 702 as described hereinbefore with respect to FIG. 5e. Core members 712, 812 are preferably generally planar in shape and secured to peripheral edge surfaces 714 of core member 702, thereby enclosing the spaces within open areas 704, 706 and 806. On assembly, frame members 710 and 810 may fit over the tabs of core members 712 and 812.

Figure 8:
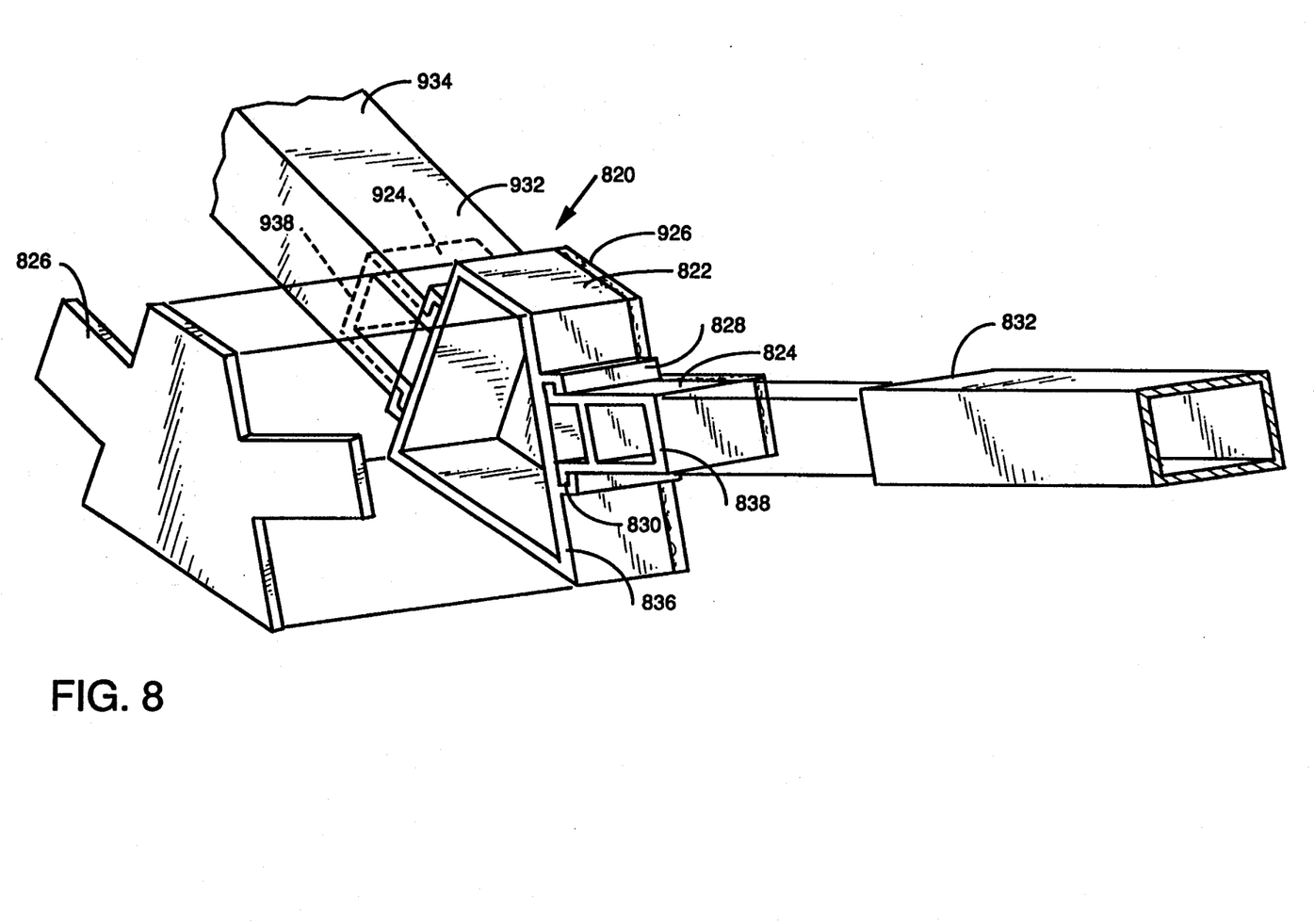
FIG. 8 is a partially exploded perspective view of another embodiment of a frame assembly of this invention.

FIG. 8 shows yet another embodiment of the frame assembly of this invention. Frame assembly 820 includes core members 822, 824, 924, 826, 926. Core members 822, 824, 924 are preferably metal extrusions. Core members 824, 924 are preferably secured to core members 822 using cooperating flanges 828, 830 or by using any other suitable means known to those skilled in the art. Core members 822, 824, 924 may be of any desired shape. Preferably, core members 824, 924 are positioned to be received into frame members 832, 932 and secured thereto as described hereinbefore with respect to FIGS. 5e and 7. Generally planar core members 826, 926 are preferably secured to peripheral edge surfaces 836, 838, 938 of core members 822, 824, 924 using welding or any other suitable means.

Figure 9:
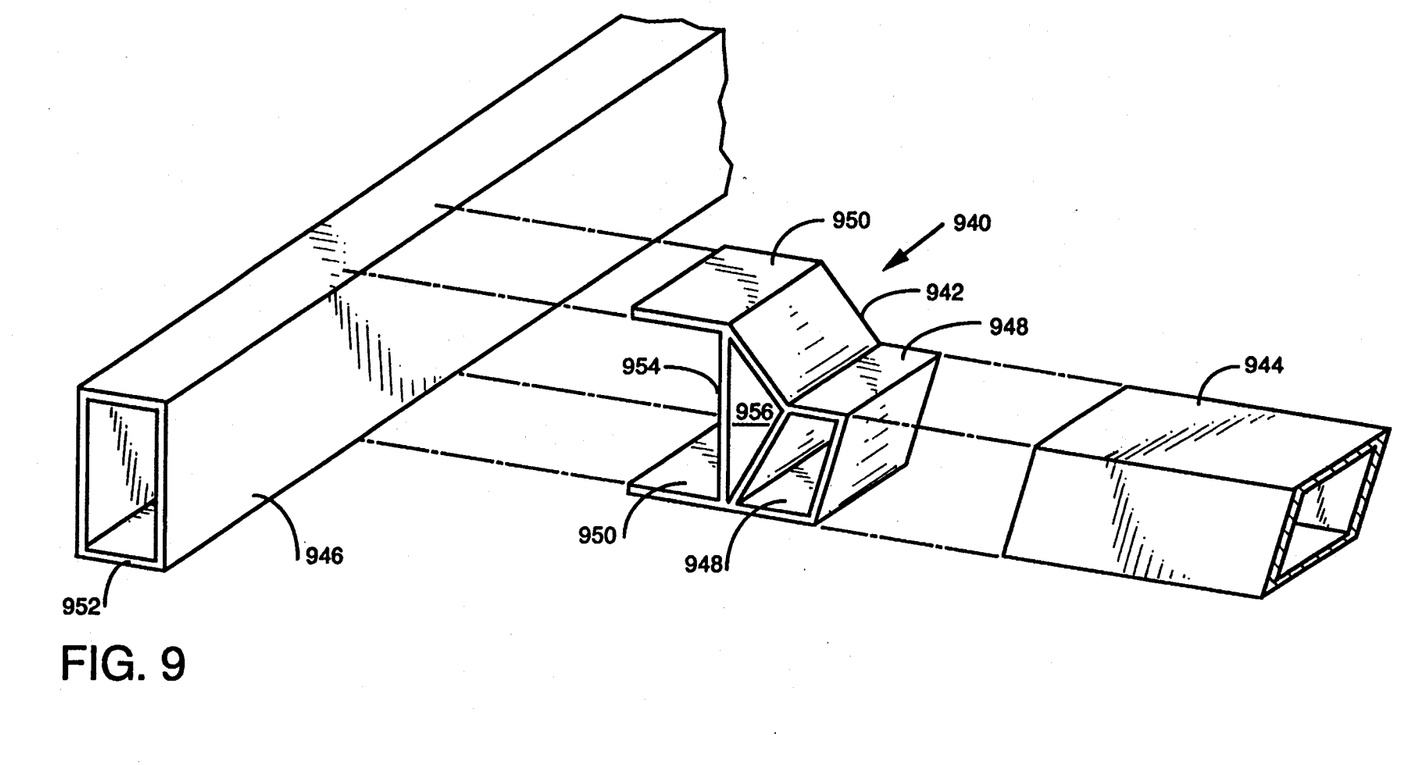
FIG. 9 is a partially exploded view of another embodiment of a frame assembly of this invention.

FIG. 9 shows another embodiment of the frame assembly of this invention. Frame assembly 940 includes core member 942 having two frame members 944, 946 secured thereto. Flange 948 extend outwardly from a central portion of one side of core member 942 and are received into the end of frame member 944. Frame member 944 may thereby be secured to core member 942. Flanges 950 extend outwardly from another central portion of core member 942. Frame member 946 is received between flanges 950 and secured to core member 942. As shown in FIG. 9, the portion of frame member 946 that is received between flanges 950 is spaced from the end 952 of frame member 946. This embodiment is particularly suitable for securing frame members at locations other than at their ends. Additional planar or nonplanar core members may be secured to peripheral edge surfaces 954 of core member 940 to fully enclose space 956, if desired.

In the preferred embodiment, all frame members and core members are constructed of aluminum. It will be appreciated, however, that any suitable materials, such as resinous plastics or other metals, may be used.

In a preferred embodiment, the planar core members are stamped from sheet material. When aluminum is used, the core members have wall thicknesses of about 0.03 to 0.25 inches. The planar core members may be bent or otherwise deformed as desired. Other core members are preferably metal extrusions. When aluminum is used, the walls of the extrusions have thicknesses of about 0.04 to 0.25 inches. It will be appreciated, however, that simple castings may be used.

Referring again to FIGS. 1 and 2, the method of this invention for joining a plurality of generally hollow frame members is shown. The method includes providing at least three frame members 4, 104, 204, 304; providing a plurality of core members 6, 106, 206, 306, 8, 108, with each core member having a central portion 10, 110, 210, 310, 10a, 110a; securing each frame member 4, 104, 204, 304 to central portion 10 of core member 6, 106, 206, 306; positioning core members 6, 106, 206, 306, 8, 108 in juxtaposition with respect to one another so as to enclose space 16 therebetween, with frame members 4 extending generally outwardly from enclosed space 16; and securing core members 6, 106, 206, 306, 8, 108 to one another. In a preferred embodiment, the method includes providing core members 6, 106, 206, 306, 8, 108 having peripheral edge surfaces 14, 114, 214, 314, 414, 514 surrounding central portion 10, 110, 210, 310, 10a, 110a respectively; positioning core members 6, 106, 206, 306, 8, 108 in juxtaposition with respect to one another such that at least one peripheral edge surface 14 of at least one core member is positioned adjacent to at least one peripheral edge surface 14 of at least one other core member; and securing adjacent peripheral edge surface 14 of adjacent core members to one another.

A preferred embodiment of the method of this invention includes providing at least one core member 6, 106, 206, 306, 8, 108 being generally planar. In addition, the method preferably includes providing at least one core member 8, 108 having at least one peripheral edge surface 414a, 514a oriented obliquely with respect to the other peripheral edge surface thereof.

Referring to FIG. 3, a preferred embodiment of the method of this invention includes providing at least one core member 30 having at least two frame members secured to a central portion 32 thereof. FIG. 3 shows core members 30 and 34 each having two frame members 28 secured thereto.

Preferably, the method of this invention includes providing rigid frame members as metal extrusions. The frame members are preferably secured to the core members using welding. However, any suitable means of securing the components together may be used. Likewise, welding is preferably used to secure the core members to one another, but any suitable means of securing the components together may be used. A preferred embodiment of the method includes providing the core members and frame members constructed of aluminum. However, it will be appreciated that any suitable material, such as resinous plastics and other metals, may be used.

Referring to FIGS. 5a through 5e, several examples of the method of securing frame members 4 to core members 6 are illustrated. FIG. 5a shows securing core member 6 directly to end 12 of frame member 4 using welding. FIG. 5b shows providing recess 60 in central portion 10b of core member 6b into which end 12b of frame member 4b is received. FIG. 5c shows providing an opening 56 in central portion 10c of core member 6c within which end 12c of frame member 4c is received. FIG. 5d shows providing a socket 70 on central portion 10d of core member 6d positioned to receive end 12d of frame member 4d therein. Socket 70 may be secured to core member 6d using welding or any other suitable means. Socket 70 is preferably a metal extrusion of sufficient size and appropriate shape to receive end 12d of frame member 4d therein. FIG. 5e shows providing a post 76 on central portion 10e of core member 6e positioned to be received into end 12e of frame member 4e and secured thereto.

It will be appreciated that the central portion of any core member may have more than one frame member secured thereto. In addition, the method of securing the frame members to the core members may utilize any one or more of the examples shown in FIGS. 5a through 5e.

It will further be appreciated that this invention may be utilized to join the ends of frame members and to join frame members at locations other than at their ends.

For convenience of illustration, certain shapes have been used to illustrate the various components of this invention. Such shapes are not intended to be limitations on the invention. It will be appreciated that the components of any desired shape may be utilized without departing from the scope of this invention.

It will be appreciated that this invention provides a method of joining a plurality of hollow frame members, and an associated frame assembly, which are simple and inexpensive to use and which can be relatively easily modified to accommodate changes in the design of the framework.

Whereas particular embodiments of this invention have been described for purposes of illustration, it will be evident to those skilled in the art that numerous variations may be made without departing from the invention as defined in the following claims.

What is claimed is:

1. A frame assembly for connecting at least two juxtaposed generally hollow frame members comprising:
   a plurality of core members each having at least one planar central portion;
   said core members positioned in juxtaposition with respect to one another and secured to one another so as to enclose at least one space therebetween; and
   attachment means securing two of said at least two generally hollow frame members to at least one said planar central portion of one of said plurality of core members, whereby the frame members extend generally outwardly from said enclosed space.

2. The frame assembly of claim 1, wherein
   each said core member has a plurality of peripheral edge surfaces surrounding said central portion; and
   at least one said peripheral edge surface of at least one said core member is positioned adjacent to and secured to at least one peripheral edge surface of an adjacent core member.

3. The frame assembly of claim 2, wherein:
   at least one said core member is generally planar.

4. The frame assembly of claim 3, wherein:
   at least one said peripheral edge surface of at least one said core member is oriented obliquely with respect to the other peripheral edge surfaces thereof.

5. The frame assembly of claim 4, wherein:
   said attachment means includes at least one recess on said central portion of at least one said core member within which the end of at least one of the frame members is received.

6. The frame assembly of claim 4, wherein:
said attachment means includes at least one opening in said central portion of at least one said core member within which the end of at least one of the frame members is received.

7. The frame assembly of claim 4, wherein:
said attachment means includes at least one post secured to said central portion of at least one said core member, said post being received into a frame member and secured thereto.

8. The frame assembly of claim 4, wherein:
said attachment means including at least one socket secured to said central portion of at least one said core member, said socket having a frame member received therein and secured thereto.

9. The frame assembly of claim 5, wherein:
said frame members are secured to said attachment means using welding.

10. The frame assembly of claim 9, wherein:
said adjacent peripheral edge surfaces of adjacent core members are secured to one another using welding.

11. The frame assembly of claim 10, wherein:
the frame members are metal extrusions.

12. The frame assembly of claim 11, wherein:
at least one said core member is a metal extrusion.

13. The frame assembly of claim 12, wherein:
at least one said core member is provided with at least one tab on a peripheral edge surface thereof; and
at least one said core member includes at least one notch on a peripheral edge surface thereof positioned to receive said tab therein to align said core members with respect to one another.

14. The frame assembly of claim 13, wherein:
at least one said frame member is aluminum; and
at least one said core member is aluminum.

* * * * *